United States Patent
Eggertsen (10) Patent No.: US 11,304,117 B2
(45) Date of Patent: Apr. 12, 2022

(54) METHOD FOR A WIRELESS COMMUNICATION SYSTEM

(71) Applicant: CPAC SYSTEMS AB, Gothenburg (SE)

(72) Inventor: Christian Eggertsen, Mölndal (SE)

(73) Assignee: CPAC SYSTEMS AB, Gothenburg (SE)

(*) Notice: Subject to any disclaimer, the term of this patent is extended or adjusted under 35 U.S.C. 154(b) by 0 days.

(21) Appl. No.: 16/976,792

(22) PCT Filed: Feb. 6, 2019

(86) PCT No.: PCT/EP2019/052950
§ 371 (c)(1),
(2) Date: Aug. 31, 2020

(87) PCT Pub. No.: WO2019/174822
PCT Pub. Date: Sep. 19, 2019

(65) Prior Publication Data
US 2021/0368418 A1 Nov. 25, 2021

(30) Foreign Application Priority Data
Mar. 15, 2018 (EP) .................................. 18162093

(51) Int. Cl.
*H04W 40/24* (2009.01)
*H04W 4/40* (2018.01)

(52) U.S. Cl.
CPC .......... *H04W 40/248* (2013.01); *H04W 4/40* (2018.02); *H04W 40/246* (2013.01)

(58) Field of Classification Search
None
See application file for complete search history.

(56) References Cited

U.S. PATENT DOCUMENTS

| 7,522,540 | B1* | 4/2009 | Maufer | H04L 45/18 370/254 |
| 2005/0202828 | A1* | 9/2005 | Pecen | H04W 36/0055 455/453 |
| 2008/0002635 | A1 | 1/2008 | Mosko et al. | |
| 2009/0073994 | A1* | 3/2009 | Qureshi | H04L 29/12792 370/401 |

(Continued)

FOREIGN PATENT DOCUMENTS

JP H0865758 A 3/1996

OTHER PUBLICATIONS

Moy Ascend Communications J et al.: "OSPF Version 2; rfc2328.txt", OSPF Version 2; RFC2328.TXT, Internet Engineering Task Force, IETF; Standard, Internet Society (ISOC) 4, Rue Des Falaises CH- 1205 Geneva, Switzerland, Apr. 1, 1998 (Apr. 1, 1998), XP015008112, pp. 140-151.

(Continued)

Primary Examiner — Brian S Roberts
(74) Attorney, Agent, or Firm — Venable LLP; Jeffri A. Kaminski (57) ABSTRACT

The present disclosure generally relates to a method for selectively forwarding data messages between a plurality of neighboring wireless communication nodes. The present disclosure also relates to a corresponding wireless communication node and to a wireless communication system.

14 Claims, 3 Drawing Sheets

(56) References Cited

U.S. PATENT DOCUMENTS

2009/0129323 A1* 5/2009 Chen ................ H04W 72/0406
370/329
2011/0122806 A1 5/2011 Huang et al.
2013/0223286 A1 8/2013 Corinella et al.

OTHER PUBLICATIONS

Extended European Search Report dated Jul. 18, 2019 in corresponding European Application No. 18162093.1, 10 pages.
International Search Report and Written Opinion dated Apr. 2, 2019 in corresponding International PCT Application No. PCT/EP2019/052950, 13 pages.
Europe Office Action, Communication pursuant to Article 94(3) EPC, dated Sep. 15, 2021 in corresponding Europe Patent Application No. 19702913.5, 6 pages.

* cited by examiner

METHOD FOR A WIRELESS COMMUNICATION SYSTEM

CROSS-REFERENCE TO RELATED APPLICATIONS

This application is a U.S. National Phase of PCT/EP2019/052950, filed Feb. 6, 2019, and published on Sep. 19, 2019, as WO 2019/174822 A1, which claims priority to European Application No. 18162093.1, filed Mar. 15, 2018, all of which is hereby incorporated by reference in its entirety.

TECHNICAL FIELD

The present disclosure generally relates to a method for selectively forwarding data messages between a plurality of neighboring wireless communication nodes. The present disclosure also relates to a corresponding wireless communication node and to a wireless communication system.

BACKGROUND

The concept of Connected Vehicle Technology (CVT) is an effort to integrate information and communication technology into transportation systems and vehicles with the goal to e.g. improve traffic safety and transportation efficiency.

To achieve this goal, CVT may utilize a variety of technologies for determining and share a present status for the vehicles and optionally infrastructure components and functions within the operational area of the vehicles. Advantageously, one or more wireless technologies may be applied, e.g. cellular technology to establish Internet connectivity required by several ITS technologies, and direct vehicle-to-vehicle (V2V) communication, vehicle-to-infrastructure (V2I), or more generally vehicle-to-everything (V2X) communication.

V2V/V2I/V2X communication may be based on known or future device-to-device (D2D) communication techniques. However, one exemplary existing technique that is specifically suitable for V2V applications is the IEEE standard 802.11p, based on the PHY and MAC layer of 802.11, i.e. OFDM and CSMA, respectively. Data broadcasts of IEEE 802.11p include information related to the position of the source, e.g. a vehicle. OFDM and CSMA refer to Orthogonal Frequency Division Multiplex and Carrier Sensing Multiple Access respectively.

In order to guarantee that a data message (broadcast or otherwise transmitted in e.g. a V2V communication scenario by e.g. a V2V enabled vehicle) is provided as intended to all vehicles in a desired coverage area it is important that other V2V enabled vehicles are in the vicinity of the transmitting vehicle to receive the transmission and to retransmit it, e.g. by broadcasting the message. This process is typically repeated until the message has been transmitted in the entire desired coverage area.

If a scenario where the density of vehicles capable of V2V communication is in comparison low, messages may not be communicated as intended, i.e. the messages may not reach all the desired recipients of the messages. However, if the density is in comparison high, there may be a congestion of the available space since, due to the repetition of transmission of the messages. Consequently, there is a desire to balance how and when messages are to be repeated, to ensure that the messages are correctly propagated/broadcasted to the relevant recipient wireless communication nodes, at the same time reducing the probability of congestion within the available wireless broadcasting space.

SUMMARY

Within the context of the present disclosure, there is below provided an elaboration in relation to the transmission of messages between wireless communication nodes of a wireless communication system. Specifically, the communication scheme in accordance to the present disclosure is exemplified for the situation where a first wireless communication node ("own wireless communication node") is receiving a message from a second wireless communication node. It should however be understood that the definition of the first and the second wireless communication node, as well as a first and a second message is only used for separation of the different wireless communication nodes/messages. That is, further wireless communication nodes (than only two) and further messages may be handled within the scope of the present disclosure.

Thus, in according to an aspect of the present disclosure, the above disclosed problems relating to propagation and congestion within a wireless communication system is, at least partly, alleviated by a wireless communication method, comprising determining, at a first wireless communication node, a first neighbor topology for the first wireless communication node, the first neighbor topology indicating wireless communication nodes located within a wireless transmission range from the first wireless communication node, receiving, wirelessly at the first wireless communication node, a first message from a second wireless communication node comprised with the first neighbor topology, the first message comprising a first set of data, an indication of an identity of the second wireless communication node and a second neighbor topology for the second wireless communication node, the second neighbor topology indicating wireless communication nodes located within a wireless transmission range from the second wireless communication node, comparing, at the first wireless communication node, the first neighbor topology with the second neighbor topology, resulting in an indication that a third wireless communication node not comprised with the second neighbor topology, and broadcasting, wirelessly from the first wireless communication node if the comparison indicates a difference between the first and the second neighbor topology, a second message to the second and the third wireless communication node, the second message comprising at least the first set of data and the indication of the identity of the second wireless communication node.

In accordance to the present disclosure, the idea is to provide an improved control of when a wireless communication node within a wireless communication system is or is not to forward a message to a neighboring wireless communication node. Advantageously, the present disclosure places focus on broadcasting of messages between neighboring wireless communication nodes such that the propagation of the messages is maximized, while at the same time minimizing the probability that the broadcasting space is cluttered with the transmission of identical messages (from the same origin).

The expression "broadcasting" should be understood to mean that a message is transmitted without a specific node in mind. Rather, the message is transmitted to all nodes within wireless transmission range from the node transmitting the message. Accordingly, also the second wireless communication node will receive the message transmitted from the first wireless communication node. It may however be possible and within the scope of the present disclosure to implement measures to ensure that the e.g. the message that was originally transmitted from the second wireless communication node to the first wireless communication node is not again processed by the second wireless communication once it has been broadcasted from the first wireless communication node. Such measures may for example be implemented by assigning each message a unique identity.

This is in accordance to the present disclosure achieved by correlating neighbor topologies, where each neighbor topology indicating wireless communication nodes located within a wireless transmission range from that specific wireless communication node. As such, a first wireless communication node will in line with the present scheme compare its own neighbor topology with a corresponding neighbor topology for a second wireless communication node from where a message is received. If it is determined that there is a discrepancy between the neighbor topologies, the first wireless communication node will "repackage" the message received form the second wireless communication node (i.e. the first message) and in turn broadcast the repackaged message (i.e. the second message) to the neighboring wireless communication nodes of the first wireless communication node.

To further reduce unwanted forwarding of messages it may in accordance to an embodiment be possible to allow the message (i.e. the first as well as the second) to comprise an essentially unique identity. By means of such an implementation it may be possible for the first wireless communication node to ensure that a specific message, with a specific identity, is only forwarded once. It may additionally be possible to allow the second message to further comprise an indication of an identity of the second wireless communication node. Also such information may be used in the determination if a message received (at the own wireless communication node) should be forwarded or not.

It should be understood that also the first wireless communication node may form "own" messages to be broadcasted to the neighboring wireless communication nodes. As such, the first wireless communication node may independently or in addition to the above form a third message at the first wireless communication node, wherein the third message comprises a second set of data formed at the first wireless communication node and the first neighbor topology. This functionality is, in line with the discussion above, what is typically also performed by the second wireless communication node for forming the first message to be received by the first wireless communication node. The third message is preferably broadcasted wirelessly from the first wireless communication node with a predetermined periodicity, such as with e.g. a periodicity between 1-20 Hz.

In an embodiment, the first and/or the second set of data is representative of information having an in comparison short lifetime. That is, the first and the second set of data formed at the second and first wireless communication node, respectively, may for example be representative of a current condition at the wireless communication node, where the current condition is expected to change in a regular manner. As such, the first and/or the second set of data may in some embodiments be expected to change with a regularity corresponding to the predetermined periodicity of the transmission of the messages sent from the wireless communication nodes. Thus, the predetermined periodicity may in one embodiment be dependent on the expected change in the (first/second) set of data formed at the (second/first) wireless communication node. The predetermined periodicity may in another embodiment be a function of the expected change in the (first/second) set of data formed at the (second/first) wireless communication node.

In line with the present disclosure, the step of determining the first neighbor topology comprises receiving, wirelessly at the first wireless communication node, a plurality of messages from neighboring wireless communication nodes located within the wireless transmission range from the first wireless communication node, determining, from the plurality of messages, indications of identities for the neighboring wireless communication nodes, and determining the first neighbor topology for the first wireless communication node based on the determined indication of identities. Put differently, the first wireless communication node will over time make a determination of which wireless communication nodes are within wireless transmission range from the first wireless communication node, based on the wireless communication node identities comprised with the messages received from the neighboring wireless communication nodes.

Accordingly, to ensure that the neighbor topology for a specific wireless communication node is kept up to date, the determination of the (first) neighbor topology is performed at a regular basis, such as once every 5-30 seconds. This regularity of re-determining the neighbor topology may of course be dependent on how the wireless communication node is arranged. For example, in case the wireless communication node is arrange with a mobile device such as e.g. a vehicle it may be desirable to re-determining the neighbor topology more often as compared to a situation where the wireless communication node is comprised with e.g. a fixed structure.

Furthermore, it should be understood that the communication scheme in accordance to the present disclosure may be implemented as a computer program, adapted to e.g. be executed using a control unit. In addition, such an implementation of the present disclosure provides similar advantages as discussed above in relation to the previous aspects of the present disclosure. The computer program may for example be stored onto a computer readable medium, where the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

In accordance to another aspect of the present disclosure, there is provided a first wireless communication node, comprising a receiver adapted for wireless reception, a transmitter adapted for wireless broadcasting, and a control unit arranged in communication with the receiver and the transmitter, wherein the control unit is adapted to determine a first neighbor topology for the first wireless communication node, the first neighbor topology indicating wireless communication nodes located within a wireless transmission range from the first wireless communication node, process a first message received by the receiver from a second wireless communication node, wherein the first message comprises a first set of data, an indication of an identity of the second wireless communication node and a second neighbor topology for the second wireless communication node, the second neighbor topology indicating wireless communication nodes located within a wireless transmission range from the second wireless communication node, compare the first neighbor topology with the second neighbor topology resulting in an indication that a third wireless communication node (C) is not comprised with the second neighbor topology (208), and broadcast, wirelessly from the first wireless communication node if the comparison indicates a difference between the first and the second neighbor topology, a second message to the second and the third wireless communication node, the second message comprising at least the first set of data and the indication of the identity of the second wireless communication node. This aspect of the present disclosure provides similar advantages as discussed above in relation to the previous aspect of the present disclosure.

In line with the above discussion, the wireless communication node may for example be comprised with a vehicle, thus making the wireless communication node mobile. In case the wireless communication node is comprised with a vehicle, the first and the second message may be adapted for at least one of V2V, V2I and V2X communication. It should be stressed that any type of general communication protocol may be used for allowing direct communication between e.g. vehicles, vehicle to infrastructure (and back), etc.

Furthermore, the first wireless communication node is preferably comprised with the above mentioned wireless communication system, further comprising a second wireless communication node, where the second wireless communication node preferably comprise (from a general implementation perspective) to the first wireless communication node. As such, the first and the second wireless communication node may be comprised with a first and a second vehicle, respectively.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1:
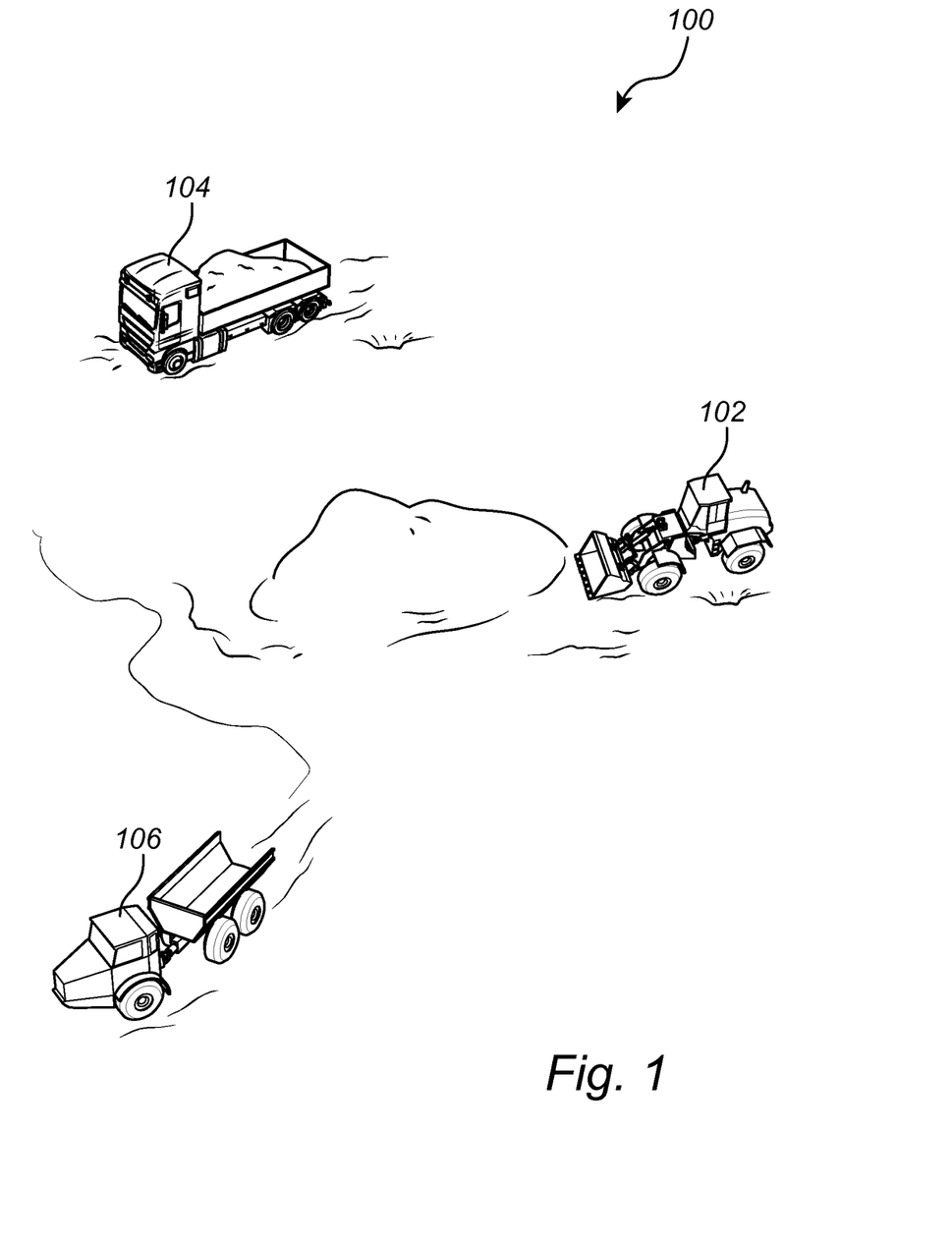
FIG. 1 shows an exemplary work site comprising a plurality of wireless communication node equipped vehicles.

Referring now to the drawings and to FIG. 1 in particular, there is depicted a work site 100 where a plurality of vehicles, exemplified by a first 102, a second 104 and a third 106 working machine is operable. Each of the working machines 102, 104, 106 is in line with the present disclosure provided with a wireless communication wireless communication node, together forming a wireless communication system. The working machines 102, 104, 106 may for example be provided in the form of e.g. excavators, dozers, loaders, and the like, adapted to perform various tasks in construction, mining and/or landscaping operations. It should of course be understood that other types of "carries" to the wireless communication nodes may be possible and within the scope of the present disclosure, including other types of vehicles as well as "fixed" elements such as buildings, signs, poles, etc.

Figure 2:
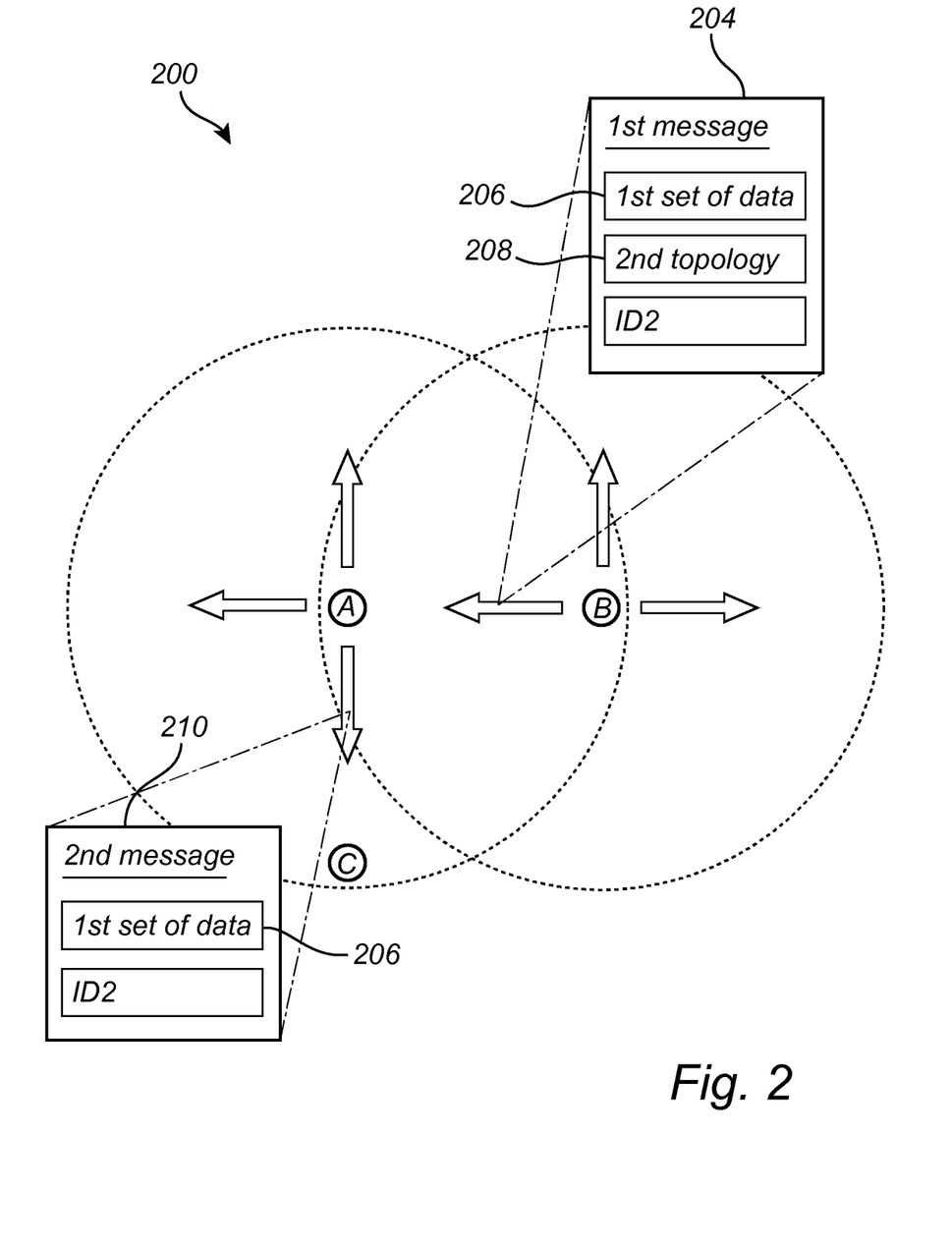
FIG. 2 exemplifies a plurality of neighboring wireless communication nodes with partly overlapping neighbor topologies.
Figure 5:
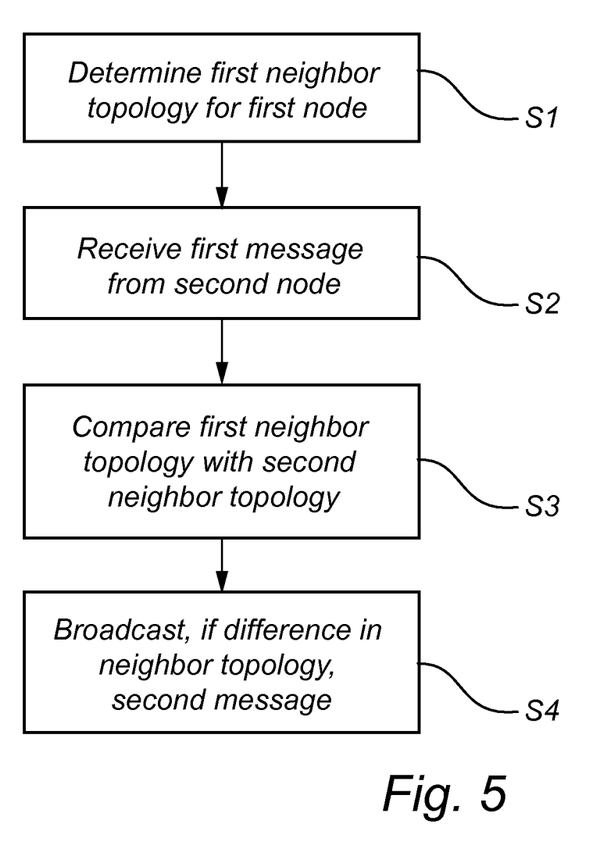
FIG. 5 illustrates the processing steps for performing the method according to the present disclosure.

As will be further elaborated below, with further reference to FIGS. 2 and 5, the second working machine 104 may in one situation broadcast a message that is received by the first working machine 102, where the first working machine 102 in line with the communications scheme according to the present disclosure may be configured to selectively forward the received message to the third working machine 106.

Thus, in line with the present disclosure, the process typically starts with that the first wireless communication node, A, illustratively exemplified as comprised with first working machine 102, determining, S1, a first neighbor topology. The first neighbor topology 202 comprises e.g. a list of other wireless communication nodes of the wireless communication system that are currently arranged within a wireless transmission range from the first wireless communication node A. In the illustration provided in FIG. 2, the first neighbor topology 202 comprises a second wireless communication node B and a third wireless communication node C. A corresponding determination of a second neighbor topology 208 is performed by the second wireless communication node B, where the second neighbor topology 208 for the second wireless communication node B comprises only the first wireless communication node A. The first A and the second B nodes now know which nodes are arranged in their respective wireless communication range.

As indicated above, it may be desirable to continuously update the respective neighbor topologies, specifically in the case where the nodes are provided as a component of e.g. a mobile carries, such as the exemplified working machines. This is of course also relevant for nodes provided as a component of e.g. a static/fixed carries but where at least some of the other nodes of the wireless communication system 108 are expected to be mobile.

During operation of the second working machine 104 (comprising the node B), operational data may be generated that may be useful for other working machines, e.g. commonly operating at the work site 100. Such operational data may for example relate to expected arrival times at specific locations at the work site 100, such as e.g. a loading location frequented by the at least some of the other working machines 102, 106. That is, if there in some situations may be congestion at the loading location, it may be desirable to ensure that the working machines 102, 104, 106 are properly scheduled in regards to arrival at the loading location. Thus, to allow such scheduling to be provided, it may be necessary for the working machines 102, 104, 106 to share adequate information there between.

Thus, in line with the present disclosure it may be desirable to broadcast the operational data formed at the second working machine 104 to the second and the third working machine 102, 106, respectively. Accordingly, in line with the present disclosure the second node B comprised with the second working machine 104 will form a first message 204. The operational data generated by the second working machine, below defined as a first set of data 206, will together with an indication of an identity (ID2) of the second wireless communication node B and the second neighbor topology 208 for the first message 204.

The first message 204 is then received, S2, by the first wireless communication node A. At the first wireless communication node A, the first message 204 is analyzed and the comprising "components" are extracted. Subsequently, a comparison, S3, is made between the first neighbor topology 202 and the second neighbor topology 208. In this example, it is determined that there is a "discrepancy" (difference) between the first 202 and the second 208 neighbor topology, specifically indicating that the third wireless communication node C is not comprised with the second neighbor topology 208. Accordingly, this is provided as an indication that the second wireless communication node B is not (at present) arranged within a wireless transmission range from the third wireless communication node C.

Accordingly, in line with the present disclosure and since the discrepancy in neighbor topologies has been determined, the first wireless communication node A will form a second message 210 to in turn be broadcasted, S4. Specifically, the second message 210 comprises the first set of data 206 (e.g. operational data from the second working machine 104) as well as the identity ID2 of the second wireless communication node B.

The broadcasting of the second message 210 will be received by the third wireless communication node C. As would be apparent from the above, the third wireless communication node C may implement a corresponding functionality, whereby the selective forwarding scheme according to the present disclosure may be applied.

Figure 3:
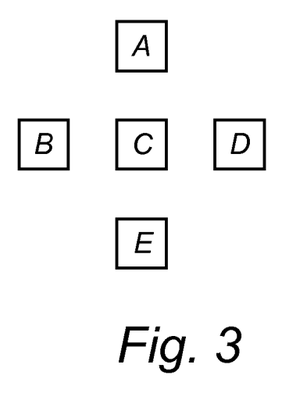
FIGS. 3 and 4 conceptually illustrates a first and a possible second wireless communication node scenario.
Figure 4:
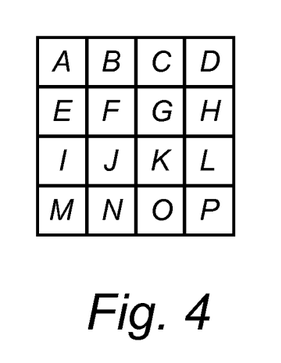

Turning now to FIGS. 3 and 4 which provide exemplary scenarios for a plurality of wireless communication nodes arranged in a first 300 and a second 400 exemplary configuration, respectively.

Specifically, in FIG. 3 there is illustrated a scenario where it is assumed that wireless communication nodes A, B, D and E do only reach the wireless communication node C, which is the spider in the middle reaching all other wireless communication nodes, making the wireless communication node C an important relay node.

The air traffic RX load at the edges (A, B, D and E) may then be defined as NumNodes−1. For example, the wireless communication node D would receive messages from the wireless communication node C as well as relay data from the wireless communication nodes A, B and E via the wireless communication node C. The RX load at the wireless communication node C is a bit more problematic. As the wireless communication nodes A, B, D and E are assumed to relay the data they receive; this information will load the air interface of the wireless communication node C.

RX load at the wireless communication node C may then be defined as (NumNodes−1)^2+NumNodes−1. In fact, similar problems will show up also for the line and circle scenarios for the cases where wireless communication nodes reach farther then the closest neighbor. Considering this, one realizes that there is a need for mechanisms to restrict the relaying to cases where there is a benefit from relaying, otherwise there is a high probability the air interface is congested, whereby the selective forwarding scheme according to the present disclosure may be applied advantageously is applied.

The wireless communication nodes presented above (e.g. wireless communication nodes A-P) may be arranged to comprise a receiver (not explicitly shown) adapted for wireless reception, a transmitter (not explicitly shown) adapted for wireless broadcasting, and a control unit (not explicitly shown) arranged in communication with the receiver and the transmitter.

In FIG. 4 there is illustrated a "parking lot scenario" where a plurality of vehicles are arranged in the vicinity of each other. In this embodiment all of the wireless communication nodes A-P are all within a wireless transmission range (radio coverage) from all other wireless communication nodes. This consequently means that a message sent from any node reaches all other nodes without any need of relay mechanism. It does also mean than the air traffic density is high, and that relaying, if implemented would increase the already high air traffic. Accordingly, in this case, by applying the presented selective forwarding scheme, in case e.g. the wireless communication node A would transmit a message, then the other nodes B-P would, based on their respective neighbor topology, determine that no discrepancy exists, whereby the message from the wireless communication node A would not be forwarded.

The control unit may for example be manifested as a general-purpose processor, an application specific processor, a circuit containing processing components, a group of distributed processing components, a group of distributed computers configured for processing, a field programmable gate array (FPGA), etc.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A wireless communication method adapted to selectively relaying operational data by wireless broadcasting to a plurality of wireless communication nodes including a first, a second and a third wireless communication node, the method comprising: determining, at the first wireless communication node, a first neighbor topology for the first wireless communication node, the first neighbor topology indicating wireless communication nodes located within a wireless transmission range from the first wireless communication node, receiving, wirelessly at the first wireless communication node, a first message from the second wireless communication node comprised with the first neighbor topology, the first message comprising a first set of operational data, an indication of an identity of the second wireless communication node and a second neighbor topology for the second wireless communication node, the second neighbor topology indicating wireless communication nodes located within a wireless transmission range from the second wireless communication node, comparing, at the first wireless communication node, the first neighbor topology with the second neighbor topology, resulting in an indication that the third wireless communication node is not comprised with the second neighbor topology, and broadcasting, wirelessly from the first wireless communication node only if the comparison indicates that the first and the second neighbor topology are not fully overlapping, a second message to the second and the third wireless communication node, the second message comprising at least the first set of operational data and the indication of the identity of the second wireless communication node.

2. The method according to claim 1, wherein the second message further comprises an indication of an identity of the first wireless communication node.

3. The method according to claim 1, further comprising: forming a third message at the first wireless communication node, wherein the third message comprises a second set of operational data formed at the first wireless communication node, an indication of an identity of the first wireless communication node, and the first neighbor topology.

4. The method according to claim 3, further comprising: broadcasting, wirelessly from the first wireless communication node, the third message with a predetermined periodicity, wherein the predetermined periodicity preferably is between 1-20 Hz.

5. The method according to claim 1, wherein the step of determining the first neighbor topology comprises: receiving, wirelessly at the first wireless communication node, a plurality of messages from neighboring wireless communication nodes located within the wireless transmission range from the first wireless communication node, determining, from the plurality of messages, indications of identities for the neighboring wireless communication nodes, and determining the first neighbor topology for the first wireless communication node based on the determined indication of identities.

6. A first wireless communication node adapted to selectively relaying operational data by wireless broadcasting to a plurality of wireless communication nodes, the first wireless communication node comprising: a receiver adapted for wireless reception, a transmitter adapted for wireless broadcasting, and a control unit arranged in communication with the receiver and the transmitter, wherein the control unit is adapted to: determine a first neighbor topology for the first wireless communication node, the first neighbor topology indicating wireless communication nodes located within a wireless transmission range from the first wireless communication node, process a first message received by the receiver from a second wireless communication node comprised with the plurality of wireless communication nodes, wherein the first message comprises a first set of operational data, an indication of an identity of the second wireless communication node and a second neighbor topology for the second wireless communication node, the second neighbor topology indicating wireless communication nodes located within a wireless transmission range from the second wireless communication node, compare the first neighbor topology with the second neighbor topology, resulting in an indication that a third wireless communication node, comprised with the plurality of wireless communication nodes, is not comprised with the second neighbor topology, and broadcast, using the transmitter only if the comparison indicates that the first and the second neighbor topology are not fully overlapping, a second message to the second and the third wireless communication node, the second message comprising at least the first set of operational data and the indication of an identity of the second wireless communication node.

7. The first wireless communication node according to claim 6, wherein the second message further comprises an indication of an identity of the first wireless communication node.

8. The first wireless communication node according to claim 6, wherein the control unit is further configured to: form a third message at the first wireless communication node, wherein the third message comprises a second set of operational data formed at the first wireless communication node, an indication of an identity of the first wireless communication node, and the first neighbor topology.

9. The first node according to claim 8, wherein the control unit is further configured to: broadcast, using the transmitter, the third message with a predetermined periodicity, wherein the predetermined periodicity preferably is between 1-20 Hz.

10. The first wireless communication node according to claim 6, wherein determining the first neighbor topology comprises further adapting the control unit to: process a plurality of messages received from neighboring wireless communication nodes located within the wireless transmission range from the first wireless communication node, determine, from the plurality of messages, indications of identities for the neighboring wireless communication nodes, and determine the first neighbor topology for the first wireless communication node based on the determined indication of identities.

11. A vehicle, comprising a first wireless communication node according to claim 6.

12. The vehicle according to claim 11, wherein the first and the second message is adapted for at least one of V2V, V2I and V2X communication.

13. The wireless communication system according to claim 11, wherein the second wireless communication node corresponds to the first wireless communication node.

14. A wireless communication system, comprising: a first wireless communication node according to claim 6, and at least a second wireless communication node.

\* \* \* \* \*